(12) United States Patent
Busson (10) Patent No.: US 11,334,513 B2
(45) Date of Patent: May 17, 2022

(54) DATA COMMUNICATION CIRCUIT

(71) Applicant: STMicroelectronics SA, Montrouge (FR)

(72) Inventor: Pierre Busson, Grenoble (FR)

(73) Assignee: STMicroelectronics SA, Montrouge (FR)

( * ) Notice: Subject to any disclaimer, the term of this patent is extended or adjusted under 35 U.S.C. 154(b) by 56 days.

(21) Appl. No.: 16/819,681

(22) Filed: Mar. 16, 2020

(65) Prior Publication Data

US 2020/0293481 A1 Sep. 17, 2020

(30) Foreign Application Priority Data

Mar. 14, 2019 (FR) ...................... 1902607

(51) Int. Cl.
| | |
|---|---|
| *G06F 13/40* | (2006.01) |
| *G06F 13/42* | (2006.01) |
| *H02J 50/10* | (2016.01) |
| *H02J 50/80* | (2016.01) |
| *H04B 5/00* | (2006.01) |
| *H02J 7/02* | (2016.01) |
| *G06F 1/16* | (2006.01) |
| *H04B 1/40* | (2015.01) |

(52) U.S. Cl.
CPC ...... *G06F 13/4068* (2013.01); *G06F 13/4282* (2013.01); *H02J 50/10* (2016.02); *H02J 50/80* (2016.02); *H04B 5/0037* (2013.01); *H04B 5/0075* (2013.01); *G06F 2213/0042* (2013.01); *H02J 7/02* (2013.01)

(58) Field of Classification Search
CPC ............ G06F 1/26; H03K 17/693; H04R 1/10
See application file for complete search history.

(56) References Cited

U.S. PATENT DOCUMENTS

| | | | |
|---|---|---|---|
| 4,985,783 A | 1/1991 | Falck | |
| 8,688,153 B2 | 4/2014 | Komori | |
| 9,344,149 B2 | 5/2016 | Inagawa et al. | |
| 10,264,647 B1* | 4/2019 | Penberthy | G01R 31/08 |
| 2011/0264389 A1* | 10/2011 | Mynam | G01R 31/086 |
| | | | 702/58 |
| 2012/0089261 A1 | 4/2012 | Kim | |
| 2012/0121102 A1* | 5/2012 | Jang | H01Q 21/30 |
| | | | 381/74 |
| 2015/0286605 A1 | 10/2015 | Waters | |

(Continued)

FOREIGN PATENT DOCUMENTS

| | | |
|---|---|---|
| CN | 102215026 A | 10/2011 |
| CN | 102571269 A | 7/2012 |

(Continued)

OTHER PUBLICATIONS

Wikipedia, "USB-C," https://en.wikipedia.org/w/index.php?title=USB-C&oldid=887479752, Sep. 20, 2021, 14 pages.

*Primary Examiner* — Getente A Yimer
(74) *Attorney, Agent, or Firm* — Slater Matsil, LLP (57) ABSTRACT

In an embodiment, a method includes receiving in parallel first data and second data; and delivering in series the first and second data, where the first data comprises electric power delivery configuration data. In some embodiments, delivering in series the first and second data includes delivering the first and second data wirelessly.

24 Claims, 6 Drawing Sheets

(56) References Cited

U.S. PATENT DOCUMENTS

| | | | |
|---|---|---|---|
| 2017/0033796 A1* | 2/2017 | Cao | H03K 19/0016 |
| 2019/0064879 A1 | 2/2019 | Jeansonne et al. | |
| 2019/0199884 A1* | 6/2019 | Shimamura | H04N 1/00965 |
| 2019/0286202 A1* | 9/2019 | Uchida | H02M 1/10 |

FOREIGN PATENT DOCUMENTS

| | | |
|---|---|---|
| CN | 103391115 A | 11/2013 |
| WO | 2016066371 A1 | 5/2016 |
| WO | 2018234242 A1 | 12/2018 |

\* cited by examiner

DATA COMMUNICATION CIRCUIT

CROSS-REFERENCE TO RELATED APPLICATIONS

This application claims the priority benefit of French Patent Application No. 1902607, filed on Mar. 14, 2019, the content of which is hereby incorporated by reference in its entirety to the maximum extent allowable by law.

TECHNICAL FIELD

The present disclosure relates generally to electronic devices, and in particularly embodiments, to a data communication circuit.

BACKGROUND

In many applications, electronic devices, such as computers, cell phones, hard disks, work stations, video displays, etc., exchange data. For this purpose, the devices are each equipped with a data communication circuit, which receives data to be transmitted, and supplies the data to a communication element such as a cable or an antenna.

SUMMARY

Some embodiments improve on known data communication methods and/or circuits.

Some embodiments improve on wired data communications.

Some embodiments relate to a method of data communication between electronic devices.

Some embodiments relate to a corresponding electronic circuit.

Some embodiments relate to a corresponding device, such as a device of wireless communication with a mobile device.

In an embodiment, a method includes receiving in parallel first electric power delivery configuration data (e.g., for power delivery negotiation) and second data, and delivering in series the first and second data.

In an embodiment, a method includes receiving in series first electric power delivery configuration data and second data, and delivering in parallel the first and second data.

According to an embodiment, the second data comprise USB data of 3.0 or higher type.

According to an embodiment, the second data comprise video data.

According to an embodiment, the first and second data in series are transmitted and/or received wireless.

According to an embodiment, a frequency of transmission/reception of the first and second serial data is greater than or equal to 60 GHz.

According to an embodiment, the device comprises a cable of USB C type capable of conveying in parallel the first and second data.

According to an embodiment, the device comprises an inductance of wireless electric power supply of the mobile device.

According to an embodiment, the device comprises spring contact terminals.

According to an embodiment, the device comprises one or a plurality of magnets.

In an embodiment, a mobile device is configured to deliver and/or to receive the first and second data of a device.

According to an embodiment, the device comprises a wireless electric power supply reception inductance.

According to an embodiment, the device comprises electric power supply contact areas.

The foregoing and other features and advantages will be discussed in detail in the following non-limiting description of specific embodiments in connection with the accompanying drawings.

DETAILED DESCRIPTION OF ILLUSTRATIVE EMBODIMENTS

The same elements have been designated with the same reference numerals in the different drawings. In particular, the structural and/or functional elements common to the different embodiments may be designated with the same reference numerals and may have identical structural, dimensional, and material properties.

For clarity, only those steps and elements which are useful to the understanding of the described embodiments have been shown and are detailed. In particular, data processing units such as a microprocessor and wireless data transceiver circuits have not been described in detail, the described embodiments being compatible with usual data processing units and usual wireless data transceiver circuits.

Throughout the present disclosure, the term "connected" is used to designate a direct electrical connection between circuit elements with no intermediate elements other than conductors, whereas the term "coupled" is used to designate an electrical connection between circuit elements that may be direct, or may be via one or more intermediate elements.

In the following description, when reference is made to terms qualifying absolute positions, such as terms "front," "rear," "top," "bottom," "left," "right," etc., or relative positions, such as terms "above," "under," "upper," "lower," etc., or to terms qualifying directions, such as terms "horizontal," "vertical," etc., it is referred to the orientation of the drawings or to a mobile device support in a normal position of use.

The terms "about," "approximately," "substantially," and "in the order of" are used herein to designate a tolerance of plus or minus 10%, preferably of plus or minus 5%, of the value in question.

Figure 1:
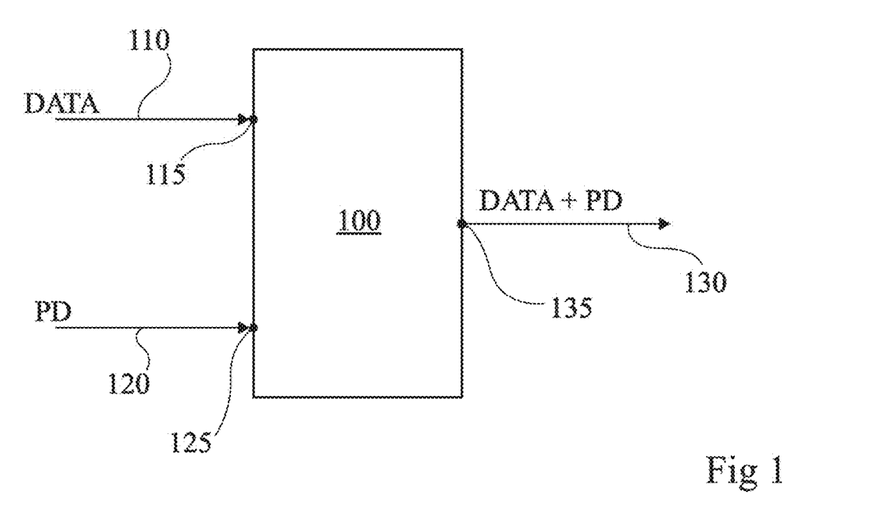
FIG. 1 very schematically shows an embodiment of a data communication circuit.

FIG. 1 very schematically shows an embodiment of a data communication circuit 100. Circuit 100 comprises two inputs 115 and 125, and one output 135.

In operation, circuit 100 receives data 110 (DATA). In the shown example, data 110 are serial data and reach circuit 100 via input 115. Input 115 for example comprises two terminals, and the data correspond to successive voltage differences between the two terminals. In some embodiments, preferably, data 110 comprise or are formed by data of USB 3.0 (or USB 3.1 Gen 1) or higher type, that is, to data having a throughput greater than or equal to 5 Gbits/s. The USB-type data may be of USB 3.1 (or USB 3.1 Gen 2) or higher type, that is, data having a throughput greater than or equal to 10 Gbits/s. As a variation, in some embodiments, data 110 may comprise or be formed by video data, that is, data containing information enabling to restore a succession of images optionally accompanied by noise.

Circuit 100 further receives, in parallel with data 110, electric power delivery configuration data 120 (PD, "Power Delivery"), that is, data containing voltage and/or intensity and/or electric power and/or state-of-charge and/or charge profile information. In some embodiments, electric power delivery configuration data 120 preferably reach circuit 100 in series through an input 125 of circuit 100. For example, input 125 comprises two terminals and data 120 correspond to voltage variations between the two terminals.

Circuit 100 places electric power delivery configuration data 120 and data 110 in series. Circuit 100 then delivers data 120 and 110 in series. More particularly, circuit 100 delivers, on an output 135, data 130 (DATA+PD) comprising electric power delivery configuration data 120 in series with data 110. For example, data 130 are formed of data 110 and 120 in series and of markers enabling to distinguish, among data 130, data 110 from data 120. Data 130 preferably have an average throughput equal to or greater than the sum of the throughputs of data 110 and 120.

Data 130 may be transmitted to an external device, not shown. Due to the fact that data 110 and 120 are delivered in series, they can be transmitted over a single link of communication with the external device, for example, a wireless communication channel. Data 110 and electric power delivery configuration data 120 are thus simpler to transmit than in parallel over separate communication links.

Figure 2:
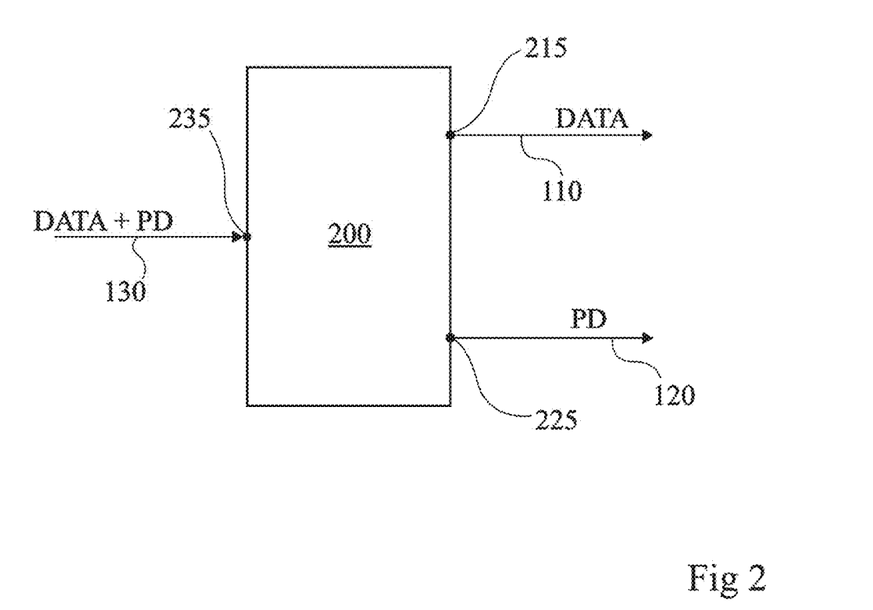
FIG. 2 very schematically shows another embodiment of a data communication circuit.

FIG. 2 very schematically shows an embodiment of a data communication circuit 200. Circuit 200 comprises an input 235 and two outputs 215 and 225.

Circuit 200 receives in series the data 130 (DATA+PD) described hereabove in relation with FIG. 1. Circuit 200 extracts data 110 (DATA) and 120 (PD) (FIG. 1) from data 130. Circuit 200 delivers data 110 and 120 in parallel on the two respective separate outputs 215 and 225. Each output 215 or 225 for example comprises two terminals between which circuit 200 applies a potential difference corresponding to data 110 or 120. In some embodiments, preferably, data 110 are delivered in series on output 215. In some embodiments, preferably, electric power delivery configuration data 120 are delivered in series on output 225.

Data 130 may originate from an external device, not shown. Since data 110 and 120 are in series, they can be received over a single communication link, for example, wireless. Data 110 and electric power delivery configuration data 120 are thus simpler to receive than from two separate communication links.

Figure 3:
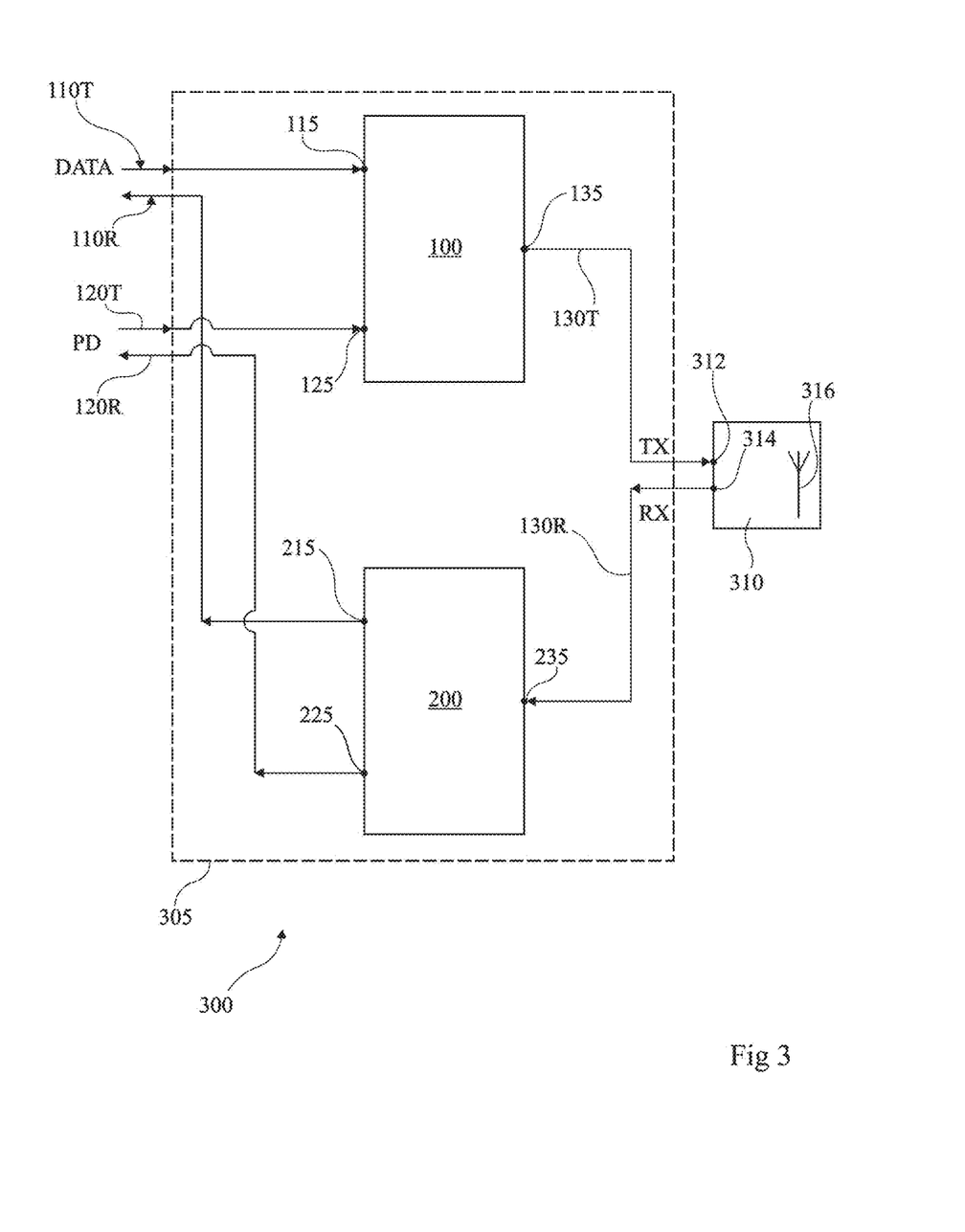
FIG. 3 very schematically shows an embodiment of a device comprising a data communication circuit and a wireless transceiver circuit.

FIG. 3 very schematically shows an embodiment of a device 300 comprising a data communication circuit 305 and a wireless transceiver circuit 310.

Circuit 305 comprises a circuit 100 of the type shown in FIG. 1, and a circuit 200 of the type shown in FIG. 2. Output 135 of circuit 100 is coupled, preferably connected, to an input 312 (TX) of transceiver circuit 310. Input 235 of circuit 200 is coupled, preferably connected, to an output 314 (RX) of transceiver circuit 310.

In operation, circuit 100 receives electric power delivery configuration data 120T (PD) to be transmitted, and data 110T (DATA) to be transmitted, of the type of the respective data 110 and 120 described in relation with FIG. 1. Circuit 100 then generates, on its output 135, serial data 130T comprising data 110T and 120T and in series, of the type of data 130 of FIG. 1. Data 130T are then transmitted by circuit 310. Preferably, data 130T are conveyed by radio frequency (RF) waves transmitted by an antenna 316 of circuit 310. In some embodiments, the radio frequency wave transmission frequency is preferably greater than 60 GHz. This enables, e.g., the transmission of data 130T when data 110T are of USB 3.0 or higher type.

Circuit 310 receives serial data 130R, for example from a device, not shown, which receives data 130T. Data 130R are preferably conveyed by radio frequency waves captured by antenna 316, or by an antenna, not shown, different from antenna 316. Data 130R are of the type of the data 130 described in relation with FIG. 1, that is, they comprise electric power delivery configuration data in series with other data. Circuit 200 receives data 130R via its input 235. Circuit 200 extracts, from data 130R, the electric power delivery configuration data (data 120R). Circuit 200 delivers, on its output 225, electric power delivery configuration data 120R. Circuit 200 further extracts, from data 130R, data 110R of the type of the data 110 described in relation with FIG. 1. Circuit 200 delivers data 110R on its output 215.

Figure 4:
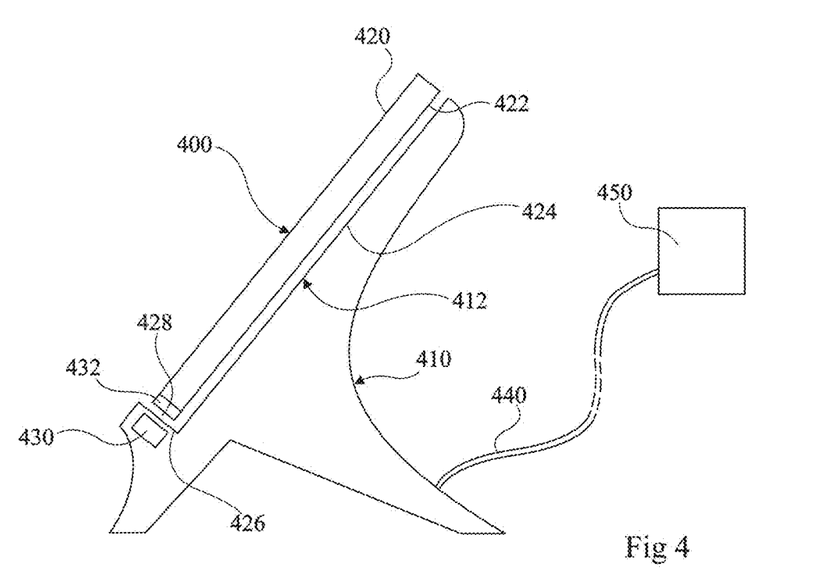
FIG. 4 very schematically shows an embodiment of a mobile device in place on a mobile device support.

FIG. 4 shows an embodiment of a mobile device 400 in place in an embodiment of a mobile device support 410.

Mobile device 400 is for example a cell phone or a tablet. Mobile device 400 may be formed by any device provided with a data processing unit, for example, a microprocessor (not shown in FIG. 4). Preferably, mobile device 400 further comprises a rechargeable electric power storage device such as a battery, for example, a lithium battery (not shown).

Support 410 comprises a location 412 intended to receive the mobile device. In the shown example, the mobile device has the shape of a planar plate having two opposite main surfaces 420 and 422. Location 412 for example comprises a planar surface 424 which, once device 400 is in place, is in contact with surface 422. In the case where mobile device 400 comprises a display, the latter is preferably located on the side of surface 420. In the shown example, in a normal position of use, surface 424 is inclined, and is limited on its lower edge by a shoulder 426. An edge 428 of the mobile device is then positioned against the shoulder. As a variation, surface 424 is horizontal in a normal position of use. Shoulder 426 may then be omitted, and the mobile device may be laid in any position on surface 424.

In some embodiments, preferably, the support comprises one or a plurality of magnets 430. Preferably, mobile device 400 comprises a ferromagnetic element 432. When the mobile device is in place in support 410, magnet(s) 430 and ferromagnetic element 432 create a force which holds mobile device 400 in place on support 410.

In some embodiments, preferably, support 410 is intended to be coupled by a cable 440 to a device 450 comprising an electric power delivery source. Device 450 is for example formed by a computer, a work station, an image display monitor, an image projector, etc. In some embodiments, preferably, device 450 comprises digital circuits such as data processing circuits, for example, a microprocessor. As a variation, in some embodiments, support 410 comprises an electric power delivery source. Support 410 may also comprise a data processing unit such as a microprocessor.

Figure 5:
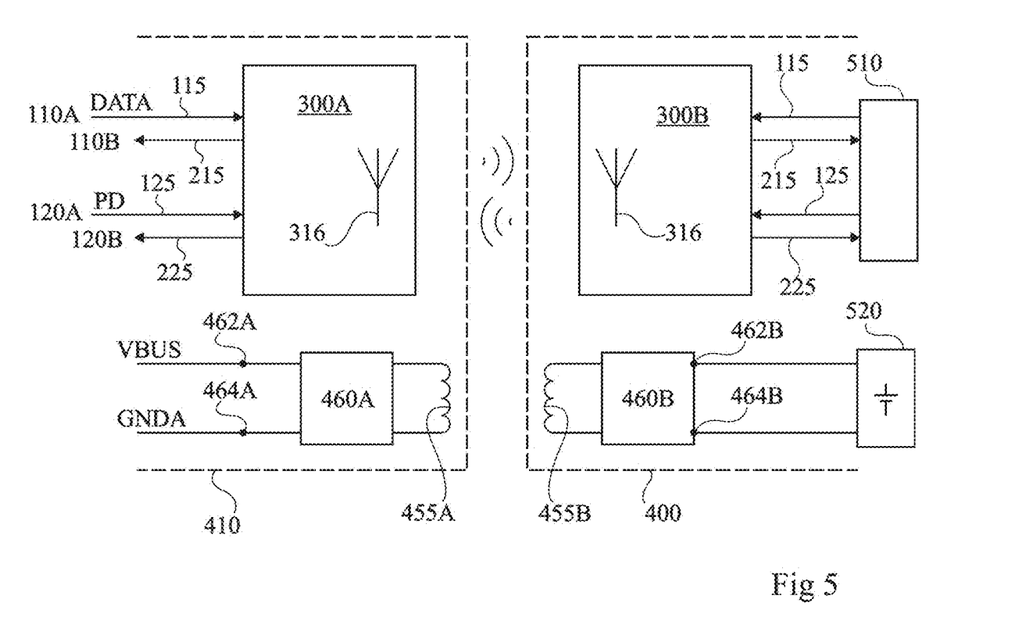
FIG. 5 very schematically shows data communication and electric power supply or delivery circuits comprised within the support and the mobile device of FIG. 4.

FIG. 5 very schematically shows communication and electric power delivery circuits comprised within support 410 and mobile device 400 of FIG. 4. The mobile device typically comprises other circuits. The other circuits are neither shown, nor detailed, the described embodiments being compatible with usual circuits of mobile devices.

Support 410 comprises a data communication circuit 300A, comprising the same elements as circuit 300 of FIG. 3. Circuit 300A thus comprises a circuit 100 (FIG. 1), a circuit 200 (FIG. 2), and a circuit 310 (FIG. 3) of wireless series transmission and/or reception comprising an antenna 316. Thus, circuit 300A is configured to receive, on its input 115, series data, preferably of USB 3.0 or higher type, and, on its input 125, electric power delivery configuration data. Antenna 316 of circuit 300A transmits in series the data received on inputs 115 and 125 of circuit 300A. Circuit 300A is further configured to receive via its antenna 316 serial data, preferably of USB 3.0 or higher type, in series with electric power delivery configuration data. Circuit 300A delivers the serial data on its output 215 and the electric power delivery configuration data on its output 225.

Support 410 further comprises an inductance 455A. Inductance 455A has its terminals coupled, preferably connected, to a circuit 460A. Circuit 460A has terminals 462A and 464A of application of a power supply voltage, for example, a DC voltage VBUS referenced to ground GNDA of support 410. Terminals 462A and 464A are for example coupled, preferably connected, for example by cable 440, to a power source comprised within device 450 (FIG. 4). As a variation, terminals 462A and 464A are coupled to an electric power delivery source internal to support 410.

Preferably, mobile device 400 comprises a circuit 300B, comprising the same elements as circuit 300 of FIG. 3. Circuit 300B thus comprises a circuit 100 (FIG. 1), a circuit 200 (FIG. 2), and a circuit 310 (FIG. 3) of series wireless transmission and/or reception, comprising an antenna 316. Thus, circuit 300B is configured to receive, on its input 115, data, preferably of USB 3.0 or higher type, and, on its input 125, electric power delivery configuration data. Antenna 316 transmits in series the data received in parallel on inputs 115 and 125 of circuit 300B. Circuit 300B is further configured to receive via its antenna 316 serial data, preferably of USB 3.0 or higher type, in series with electric power delivery configuration data. Circuit 300B delivers the serial data on its output 215 and the electric power delivery configuration data on its output 225. Outputs 215 and 225 of circuit 300B are coupled, preferably connected, to circuits of the mobile device, for example, to a microprocessor 510.

Mobile device 400 further comprises an inductance 455B. When mobile device 400 is in place on base 410, inductances 455A and 455B are in mutual coupling. Inductance 455B has its terminals coupled, preferably connected, to a circuit 460B. Circuit 460B has terminals 462B and 464B coupled, preferably connected, to other elements of the mobile device, for example, to an electric power storage element 520 located in the mobile device. Power storage element 520 for example comprises a battery.

In operation, data 110A, preferably data of USB 3.0 or higher type, and electric power delivery configuration data 120A reach respective inputs 115 and 125 of circuit 300A. Data 110A for example originate from device 450 (FIG. 4). Data 110A and 120A are for example conveyed by cable 440.

Data 110A and 120A are placed in series and transmitted by circuit 300A. Serial data 110A and 120A reach circuit 300B wireless and are received by circuit 300B. Circuit 300B then delivers data 110A and 120A on respective outputs 215 and 225. Data 110A are for example received by the circuits of mobile device 400, for example, by microprocessor 510.

Similarly, data 110B, preferably data of USB 3.0 or higher type, and electric power delivery configuration data 120B reach the respective inputs 115 and 125 of circuit 300B. Data 110B and 120B for example originate from microprocessor 510.

Data 110B and 120B are placed in series and transmitted by circuit 300B. Data 110B and 120B reach circuit 300A wireless. Circuit 300A then delivers data 110B and 120B in parallel on the respective outputs 215 and 225 of circuit 300A. Data 110B are for example conveyed by cable 440. The data for example reach device 450.

Thus, when mobile device 400 is in place on support 410, the mobile device and the support may exchange data of USB 3.0 or higher type and, simultaneously, electric power delivery configuration data. The exchanged electric power delivery configuration data 120A and 120B preferably contain information relative to the power supply voltage and/or the state of charge and/or the supply power and/or the power supply current of mobile device 400. Data 120A and 120B preferably correspond to the standard known as "USB Power Delivery."

As an application of the exchanged power delivery configuration data, circuit 460A applies an AC voltage to inductance 455A. The AC voltage is transmitted by mutual coupling to inductance 455B. The AC voltage across inductance 455B is used as a power source by circuit 460B to generate on terminals 462B and 464B a power supply voltage V, for example, referenced to the ground of the mobile device.

Thus, when mobile device 400 is in place on support 410, the mobile device and the support may exchange data, and at the same time the mobile device may be recharged. In some embodiments, the supply power is preferably in the range from 1 W to 15 W.

Such a data exchange and such a recharge are performed without using a male connector and a female connector connected to each other, such as USB-type connectors. In some embodiments, problems which would appear if the data and the electric power were conveyed via such connectors, such as connection reliability problems, are thus avoided. Such problems may particularly occur after a plurality of connection and disconnection cycles. Further, a mobile device comprising a female USB connector may have a thickness greater than that of the connector. In the absence of such a connector, in some embodiments, mobile device 400 can thus advantageously have a decreased thickness.

Figure 6:
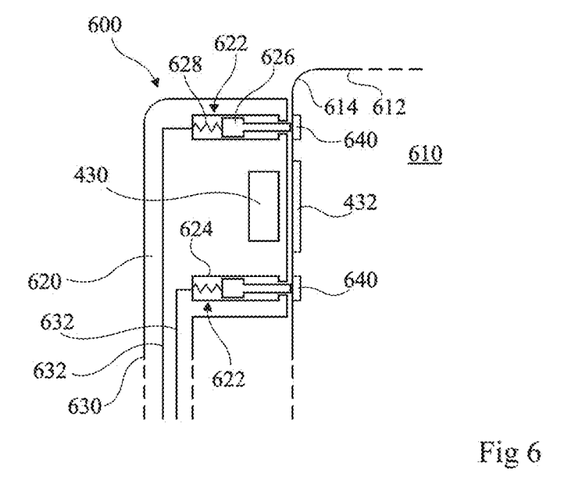
FIG. 6 schematically and partially shows an embodiment of a wireless communication and power delivery device, coupled to a mobile device.

FIG. 6 schematically and partially shows an embodiment of a wireless communication and electric power delivery device 600, coupled to a mobile device 610. Only a portion of mobile device 610 is shown. Mobile device 610 is of the type of mobile device 400 of FIG. 4, with the difference that it may possibly be comprise no inductance 455B. As an example, mobile device 610 is a mobile phone in the form of a planar plate, having an edge 612 shown next to a corner 614 of the plate, for example, a rounded corner.

Device 600 comprises a body 620 located at one end of a cable 630. Cable 630 for example has its other end coupled to a device of the type of device 450 described in relation with FIG. 4.

The body comprises two spring contact terminals 622. In some embodiments, the spring contact terminals are preferably of the type known under trade name "PoGo." Each terminal then comprises a housing 624 emerging on the side of the mobile device, containing a conductive contact element 626 and a spring 628 bearing between the bottom of housing 624 and contact element 626. Each element 626 is connected to a wire 632 running through cable 630. When device 600 is in place against the edge of mobile device 610, springs 628 create a force which holds mobile elements 626 in contact with the mobile device.

The mobile device comprises two electrically conductive contact areas 640. The contact areas are positioned to each be in contact with one of elements 626 when device 600 is in place against mobile device 610. Conductive wires 632 are then electrically connected to the contact areas 640 of mobile device 610. Contact areas 640 are coupled to the circuits of mobile device 610. Conductive wires 632 are thus electrically connected to the circuits of mobile device 610.

In some embodiments, device 600 further preferably comprises one or a plurality of magnets 430. When device 600 is in place against the mobile device, the element interacts with a ferromagnetic element 432 of the mobile device, which creates a force which maintains device 600 in place against mobile device 610.

Figure 7:
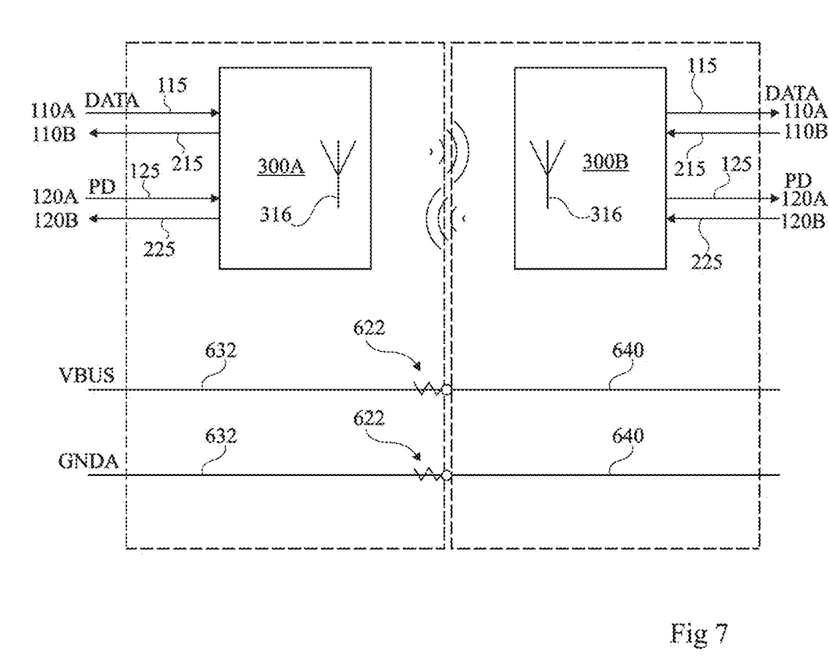
FIG. 7 very schematically shows data communication and electric power delivery circuits, comprised within the communication and power delivery device and within the mobile device of FIG. 6.

FIG. 7 very schematically shows communication and electric power delivery circuits comprised within the communication and electric power delivery device, and within the mobile device of FIG. 6.

Device 600 comprises a circuit 300A of the type of circuit 300 of FIG. 3. Mobile device 610 comprises a circuit 300B of the type of circuit 300 of FIG. 3.

The operation of circuits 300A and 300B is similar to that of circuits 300A and 300B described in relation with FIG. 5. Data 110A and 120A for example originate from a device of the type of device 450 described in relation with FIG. 4, coupled, preferably connected, to cable 620. Data 110A and 120A are conveyed by cable 630 and reach inputs 115 and 125 of circuit 300A. Data 110A and 120A are transmitted, as previously explained, to outputs 215 and 225 of circuit 300B. The data are received by circuits of mobile device 610, for example, by a microprocessor. Similarly, data 110B and 120B originating from the mobile device reach outputs 115 and 125 of circuit 300A, and are for example conveyed by cable 630 all the way to device 450.

In parallel with the data transmission, since contact areas 640 are connected to wires 632 by spring terminals 622, device 450 may apply to areas 640 a voltage VBUS, for example, referenced to ground GNDA. The voltage is applied according to the electric power delivery configuration data 120A and 120B exchanged between device 450 and mobile device 610. This voltage may be used by circuits of the mobile device (not shown) to, e.g., charge a power storage element. The described embodiments are compatible with usual power storage elements of mobile devices and usual charge circuits.

In the same way as for support 410 and mobile device 400 described in relation with FIGS. 4 and 5, the data exchange between device 600 and mobile device 610 and, simultaneously, the recharge of the mobile device by a voltage configured according to electric configuration data 120A and 120B, are thus obtained with no USB-type connector.

Figure 8:
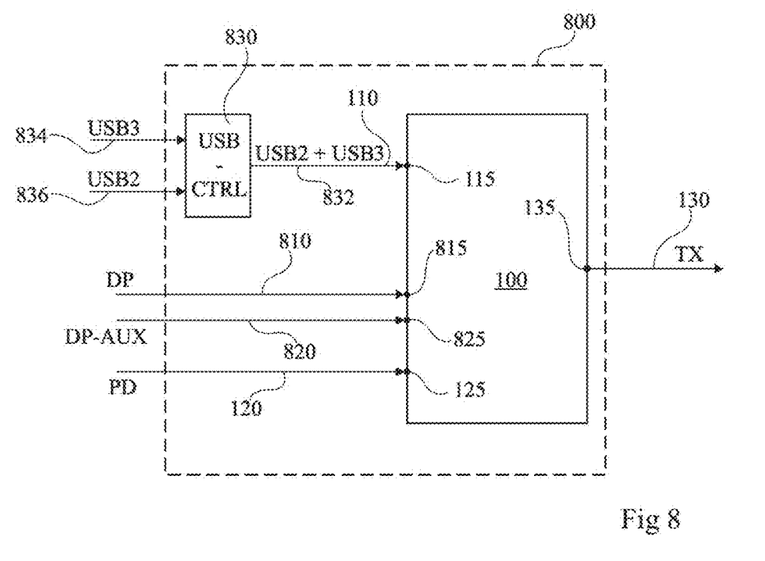
FIG. 8 schematically shows an embodiment of a data communication circuit.

FIG. 8 schematically shows an embodiment of a data communication circuit 800.

Circuit 800 comprises a circuit 100 of the type of that in FIG. 1. Thus, circuit 100 is configured to receive power delivery configuration data 120 and data 110, and to deliver data 130 (TX) comprising data 110 and 120 in series.

Data 110 comprise data of USB 3.0 or higher type. In the shown example, data 110 further comprise serial data of USB 2 type, that is, data having a throughput which may range up to 480 Mb/s.

Circuit 100 further comprises a video data input 815. In some embodiments, preferably, video data 810 correspond to the standard known as "DisplayPort" (DP). In the case of video data complying with this standard, circuit 100 further preferably comprises an input 825 for serial data 820. Data 820 correspond to an auxiliary channel (DP-AUX) of data transmitted in parallel to video signal 810. The auxiliary channel enables to communicate information associated with the video and optionally audio information conveyed by video data 810. Video data 810 and auxiliary data 820 are not described in detail, the embodiments being compatible with usual video and auxiliary signals, in particular signals at the "DisplayPort" standard.

In operation, circuit 100 receives data 110, electric power delivery configuration data 120, video data 810, and, optionally, data 820. The data 130 delivered by circuit 100 comprise data 810 and 820, in series with data 110 and 120.

In some embodiments, preferably, circuit 800 further comprises a circuit 830 (USB-CTRL) having an output 832 coupled to input 115 of circuit 100. Circuit 830 has two inputs 834 and 836 provided to respectively receive data of USB 3.0 or higher type (USB 3), and of USB 2 type. Circuit 830 receives the USB 2 and USB 3 data and delivers on output 832 the USB 2 and USB 3 data, for example, in series (USB2+USB3). Thus, circuit 800 receives the USB 2, USB 3 data, electric power delivery configuration data 120, video data 810, and, optionally, data 820. The data 130 delivered by circuit 800 comprise, in series, the USB 2 data, the USB 3 data, electric power delivery configuration data 120, video data 810, and data 820.

Figure 9:
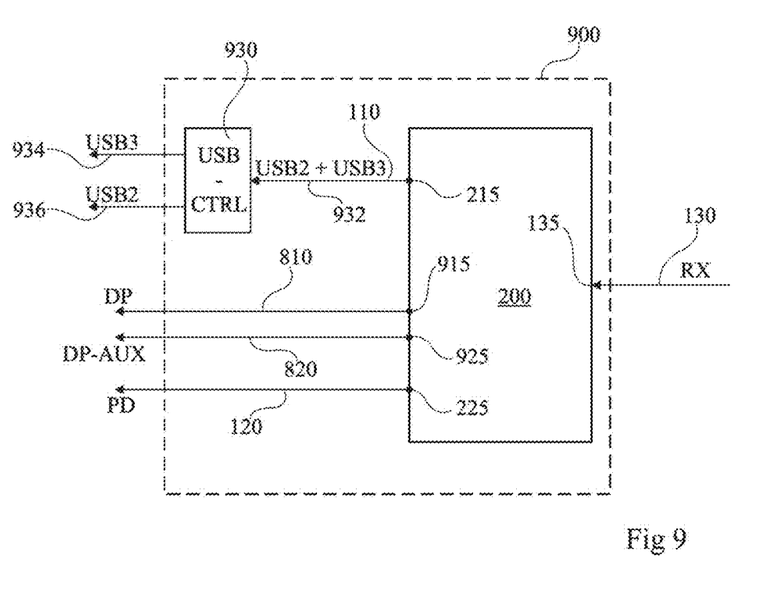
FIG. 9 schematically shows another embodiment of a data communication circuit.

FIG. 9 schematically shows an embodiment of a data communication circuit 900.

Circuit 900 comprises a circuit 200 of the type of that in FIG. 2. Thus, circuit 200 comprises a data input 130 (RX). In operation, the data are for example received by an antenna of a receive circuit external to circuit 900. Circuit 200 delivers in parallel, on its outputs 215 and 225, respective data 110 and 120. Data 110 and 120 are extracted from data 130. Data 120 are electric power delivery configuration data. Data 110 are preferably of the type of data 110 of FIG. 8, that is, comprises serial data of USB 2 type, or of USB 3.0 or higher type.

Circuit 200 further comprises outputs 915 and 925. In operation, circuit 200 extracts data 810 and 820 in addition to data 110 and 120, from serial data 130. Data 810 and 820 are identical or similar to those described in relation with FIG. 8. In particular, data 810 are video data, preferably at the "DisplayPort" standard. Data 820 correspond to the auxiliary data channel of the "DisplayPort" standard.

In some embodiments, preferably, output 215 of circuit 200 is coupled to an input 932 of a circuit 930 (USB-CTRL). Circuit 930 receives data 110 and delivers in parallel, on respective outputs 934 and 936, the USB 2 and USB 3 data. Thus, circuit 900 receives, in series, the USB 2 data, the USB 3 data, electric power delivery configuration data 120, video data 810, and data 820. Circuit 900 delivers on its respective outputs the USB 2, USB 3 data, power delivery configuration data 120, video data 810, and data 820.

Circuit 800 of FIG. 8 may replace circuit 100 in the embodiments of FIGS. 3 to 7. Similarly, circuit 900 of FIG. 9 may replace circuit 200 in these embodiments.

In particular, in a preferred embodiment, one replaces, in each of circuits 300A and 300B of support 410 and of the mobile device 400 of FIGS. 4 and 5, circuits 100 and 200 respectively with circuits 800 and 900. The USB 2, USB 3, 810 (DP), 820 (DP-AUX), 120 (PD) data which reach circuit 800, and the USB 3, USB 2, 810 (DP), 820 (DP-AUX), 120 (PD) data which originate from circuit 900, are conveyed by cable 440. As mentioned, cable 440 further conveys power supply voltage VBUS referenced to ground (GND). Cable 440 is then preferably a cable corresponding to the USB-C standard. Thus, support 410 forms a mobile device support allowing a communication with the mobile device and the power supply of the mobile device, according to the USB-C standard, without for the mobile device to be equipped with a USB-C-type connector. In some embodiments, the above-discussed reliability problems of the USB-C connector are thus avoided and the thickness of the mobile device can be decreased.

Similarly, in another preferred embodiment, one replaces, in each of circuits 300A and 300B of device 600 and of the mobile device 610 of FIGS. 6 and 7, circuits 100 and 200 respectively with circuits 800 and 900. Cable 630 is then preferably a cable corresponding to the USB-C standard. Thus, in some embodiments, device 600 allows the communication with the mobile device and the power supply of the mobile device according to the USB C standard, without for the mobile device to be equipped with a USB C-type connector.

Figure 10:
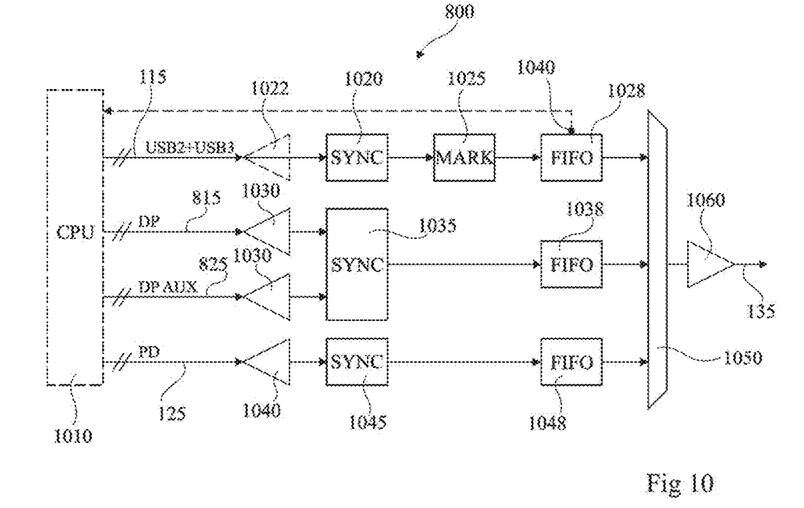
FIG. 10 schematically shows in further detail the communication circuit of FIG. 8 coupled to a data processing unit.

FIG. 10 schematically shows in further detail the circuit 800 of FIG. 8, coupled to a data processing unit 1010 (CPU). Data processing unit 1010 may be formed by a microprocessor 510 (FIG. 5) of a mobile device, or by a microprocessor of device 450 (FIG. 4).

Inputs 115, 815, 825, and 125 of circuit 800 are coupled to unit 1010. Circuit 830 (FIG. 8), optional, is not shown herein. Input 115 is coupled to the input of a synchronization circuit (SYNC) 1020. In the case where data 110 (USB2+USB3) are serial data, the connection between input 115 and circuit 1020 may comprise a deserializer 1022. As a variation, the USB 2 and USB 3 data at the output of circuit 1022 are not in series, and deserializer 1022 may be omitted, input 115 being then preferably connected to circuit 1020. The output of synchronization circuit 1020 is coupled, preferably connected, to the input of a circuit 1025 (MARK). The output of circuit 1025 is coupled, preferably connected, to the input of a FIFO-type stack 1028 ("first in first out"). Inputs 815 and 825 are each coupled, preferably connected, to the input of a deserializer circuit 1030. The deserialized outputs of deserializers 1030 are each coupled, preferably connected, to an input of a synchronization circuit 1035. The output of synchronization circuit 1035 is coupled, preferably connected, to the input of a FIFO stack 1038. Input 125 is coupled, preferably connected, to the input of a deserializer circuit 1040. The output of deserializer circuit 1040 is coupled, preferably connected, to a synchronization circuit 1045. The output of synchronization circuit 1045 is coupled, preferably connected, to the input of a FIFO stack 1048. The outputs of FIFO stacks 1028, 1038, and 1048 are coupled, preferably connected, to inputs of a multiplexer 1050. The output of multiplexer 1050 is coupled, preferably connected, to the input of a serializer circuit 1060. Output 1060 of serializer circuit 1060 forms, or is coupled to, output 135 of circuit 100.

In operation, the data 110, 120, 810, and 820 (FIG. 8) entering circuit 800 are synchronized and then stored in the FIFO stacks. The data are removed from the FIFO stacks by multiplexer circuit 1050 in a predefined data serializing order. The data extracted from the FIFO stacks are serialized by circuit 1060 and delivered on output 135. Circuit 1025 enables to insert, among data 110, marks defining the beginning of a serial data frame. As a variation, circuit 1025 may be located between circuit 1035 and circuit 1038.

Preferably, at least one of the FIFO stacks 1028, 1038, and 1048, for example, stack 1028, comprises an output 1040 coupled to unit 1010. When the filling level of stack 1028 exceeds a given threshold, a signal is transmitted on output 1040. Unit 1010 interprets this signal as a request to slow down the data rate or throughput entering circuit 800. This enables to adjust the data rate entering circuit 800 according to a maximum rate, for example, a maximum rate of transmission by a circuit such as circuit 310 described in relation with FIG. 3.

Figure 11:
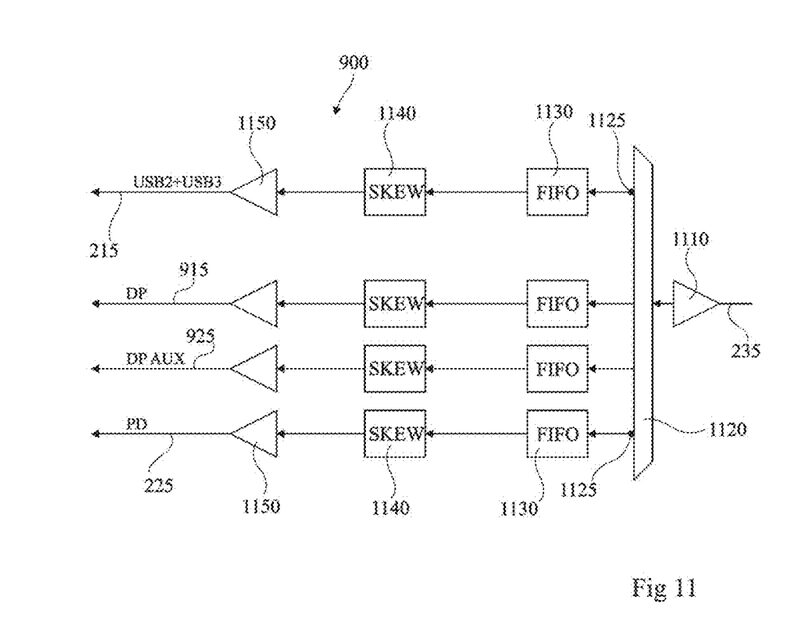
FIG. 11 schematically shows in further detail the communication circuit of FIG. 9.

FIG. 11 schematically shows in further detail circuit 900 of FIG. 9.

Input 235 of circuit 900 is coupled, preferably connected, to the input of a deserializer circuit 1110. The output of deserializer 1110 is coupled, preferably connected, to the input of a demultiplexer circuit 1120. The demultiplexer comprises four outputs 1125. Each of outputs 1125 is coupled, preferably connected, to one of outputs 125, 915, 925, and 225 of circuit 900, successively via a FIFO stack 1130, a data alignment circuit (SKEW) 1140, and a serializer circuit 1150.

In operation, demultiplexer circuit 1120 detects the order of the data, for example, by using marks such as those delivered by circuit 1025 (FIG. 10). Circuit 1125 then distributes the data into FIFO stacks 1130. The data are then delivered in series on outputs 215, 915, 925, and 225. As a variation, data USB 2 and USB 3 are not in series and are for example delivered to a circuit of the type of circuit 930 of FIG. 9. The circuit of FIG. 9 delivers data USB 3 and USB 2 on two different outputs.

Various embodiments and variations have been described. It will be understood by those skilled in the art that certain features of these various embodiments and variations may be combined, and other variations will occur to those skilled in the art.

Finally, the practical implementation of the described embodiments and variations is within the abilities of those skilled in the art based on the functional indications given hereabove.

Such alterations, modifications, and improvements are intended to be part of this disclosure, and are intended to be within the spirit and the scope of embodiments of the present invention. Accordingly, the foregoing description is by way of example only and is not intended to be limiting. The present invention is limited only as defined in the following claims and the equivalents thereto.

What is claimed is:

1. A method comprising:
   receiving in parallel, with a first circuit, first digital data and second digital data using a first frequency; and
   delivering in series, with the first circuit, the first and second digital data using a second frequency higher than the first frequency, wherein the first digital data comprises electric power delivery configuration data, and wherein the first circuit comprises an active circuit.

2. The method of claim 1, wherein the second digital data comprise USB data of 3.0 or higher type.

3. The method of claim 1, wherein the second digital data comprise video data.

4. The method of claim 1, wherein delivering in series the first and second digital data comprises delivering the first and second digital data wirelessly.

5. The method of claim 1, further comprising receiving the delivered first and second digital data wirelessly.

6. The method of claim 4, wherein the second frequency is greater than or equal to 60 GHz.

7. A method comprising:
receiving in series first digital data and second digital data at a first frequency; and
delivering in parallel the first and second digital data at a second frequency that is lower than the first frequency, wherein the first digital data comprises electric power delivery configuration data.

8. The method of claim 7, further comprising:
receiving in parallel third data and fourth data; and
delivering in series the third and fourth data, wherein the third data comprises electric power delivery configuration data.

9. The method of claim 7, wherein the second digital data comprise USB data of 3.0 or higher type.

10. The method of claim 7, wherein the second digital data comprise video data.

11. The method of claim 7, wherein receiving the first and second data comprises receiving the first and second digital data wirelessly.

12. The method of claim 11, wherein receiving the first and second digital data comprises using a frequency of reception that is greater than or equal to 60 GHz.

13. An electronic circuit comprising:
a first input terminal configured to receive first digital data, wherein the first digital data comprises electric power delivery configuration data;
a second input terminal configured to receive second digital data, wherein the electronic circuit is configured to receive the first digital data and the second digital data in parallel at a first frequency; and
an output terminal configured to deliver in series the first and second digital data at a second frequency higher than the first frequency.

14. The electronic circuit of claim 13, further comprising:
a multiplexer having an output coupled to the output terminal;
a first in first out (FIFO) stack coupled between the first input terminal and a first input of the multiplexer;
a second FIFO stack having an output coupled to a second input of the multiplexer; and
a marking circuit coupled between the second input terminal and the second FIFO stack, wherein the electronic circuit is configured to store first and second digital data in the first and second FIFO stacks, respectively, and remove data from the first and second FIFO stacks in a predefined serializing order using the multiplexer, wherein the marking circuit is configured to insert marks in the second digital data to indicate a beginning of a serial data frame.

15. A device comprising:
a first communication circuit comprising:
a first input terminal configured to receive first digital data, wherein the first digital data comprises electric power delivery configuration data,
a second input terminal configured to receive second digital data, wherein the first communication circuit is configured to receive the first digital data and the second digital data in parallel at a first frequency, and
an output terminal configured to deliver in series the first and second digital data at a second frequency higher than the first frequency; and
a second communication circuit comprising:
an input terminal configured to receive in series third data and fourth data,
a first output terminal configured to deliver the third data, and
a fourth output terminal configured to deliver the fourth data, wherein the second communication circuit is configured to deliver the third and fourth data in parallel, and wherein the third data comprises electric power delivery configuration data.

16. The device of claim 15, comprising a cable of USB C type capable of conveying in parallel the first and second digital data.

17. The device of claim 15, comprising an inductance configured to transmit power wirelessly to a mobile device.

18. The device of claim 15, comprising spring contact terminals.

19. The device of claim 15, comprising a magnet.

20. A mobile device configured to receive the first and second digital data in series from the device of claim 15.

21. A mobile device comprising:
a first communication circuit comprising:
a first input terminal configured to receive first digital data, wherein the first data comprises electric power delivery configuration data,
a second input terminal configured to receive second digital data, wherein the first communication circuit is configured to receive the first digital data and the second digital data in parallel at a first frequency, and
an output terminal configured to deliver in series the first and second digital data at a second frequency higher than the first frequency; and
a second communication circuit comprising:
an input terminal configured to receive in series third data and fourth data,
a first output terminal configured to deliver the third data, and
a fourth output terminal configured to deliver the fourth data, wherein the second communication circuit is configured to deliver the third and fourth data in parallel, and wherein the third data comprises electric power delivery configuration data, wherein the second digital data comprise USB data of 3.0 or higher type.

22. The device of claim 21, comprising power supply contact areas.

23. The device of claim 21, further comprising a wireless power supply reception inductance configured to receive wireless power, wherein the electric power delivery configuration data is associated with the wireless power.

24. The electronic circuit of claim 14, wherein the electronic circuit is configured to cause a slowing of a data rate entering the electronic circuit when a filling level of the second FIFO stack exceeds a given threshold.

* * * * *

UNITED STATES PATENT AND TRADEMARK OFFICE
CERTIFICATE OF CORRECTION

PATENT NO. : 11,334,513 B2
APPLICATION NO. : 16/819681
DATED : May 17, 2022
INVENTOR(S) : Busson Page 1 of 1

It is certified that error appears in the above-identified patent and that said Letters Patent is hereby corrected as shown below:

In the Claims

Claim 5, Column 11, Line 8, delete "1" and insert --4--.

Signed and Sealed this
Twenty-eighth Day of June, 2022

Katherine Kelly Vidal
*Director of the United States Patent and Trademark Office*